(12) United States Patent
Tan et al.

(10) Patent No.: US 11,221,516 B2
(45) Date of Patent: Jan. 11, 2022

(54) BACKLIGHT MODULE AND LIQUID CRYSTAL DISPLAY DEVICE

(71) Applicant: BOE TECHNOLOGY GROUP CO., LTD., Beijing (CN)

(72) Inventors: Jifeng Tan, Beijing (CN); Wenqing Zhao, Beijing (CN); Wei Wang, Beijing (CN); Xiaochuan Chen, Beijing (CN); Xiandong Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 553 days.

(21) Appl. No.: 16/315,369

(22) PCT Filed: Feb. 24, 2018

(86) PCT No.: PCT/CN2018/077079
§ 371 (c)(1),
(2) Date: Jan. 4, 2019

(87) PCT Pub. No.: WO2019/019623
PCT Pub. Date: Jan. 31, 2019

(65) Prior Publication Data
US 2021/0325729 A1 Oct. 21, 2021

(30) Foreign Application Priority Data
Jul. 24, 2017 (CN) .......................... 201710608440.9

(51) Int. Cl.
*G02F 1/13357* (2006.01)
*F21V 8/00* (2006.01)
*G02F 1/1335* (2006.01)

(52) U.S. Cl.
CPC ..... *G02F 1/133605* (2013.01); *G02B 6/0016* (2013.01); *G02F 1/133514* (2013.01);
(Continued)

(58) Field of Classification Search
CPC ......... G02F 1/133605; G02F 1/133606; G02F 1/133607; G02F 1/133611
(Continued)

(56) References Cited

U.S. PATENT DOCUMENTS

2005/0254258 A1 11/2005 Lee
2007/0076417 A1 4/2007 Yang et al.
(Continued)

FOREIGN PATENT DOCUMENTS

CN 1607435 A 4/2005
CN 1900784 A 1/2007
(Continued)

OTHER PUBLICATIONS

First Chinese Office Action dated Jul. 24, 2019.
(Continued)

*Primary Examiner* — Christopher M Raabe
(74) *Attorney, Agent, or Firm* — Dilworth & Barrese, LLP.; Michael J. Musella, Esq.

(57) ABSTRACT

A backlight module and a liquid crystal display device are provided. The backlight module includes: a light guide plate including a light incident surface, a light emergent surface, and a bottom surface opposite to the light emergent surface; a light source, disposed on a side of the light incident surface of the light guide plate, the light emitted by the light source enters the light guide plate from the light incident surface; a plurality of collimating parts, disposed on at least one of the light emergent surface of the light guide plate and the bottom surface opposite to the light emergent surface, wherein a portion of the light entering the light guide plate is collimated by the plurality of collimating parts and then emitted from the light emergent surface of the light guide plate.

20 Claims, 5 Drawing Sheets

(52) U.S. Cl.
CPC .. *G02F 1/133606* (2013.01); *G02F 1/133607* (2021.01); *G02F 1/133611* (2013.01)

(58) Field of Classification Search
USPC .......................................................... 349/62
See application file for complete search history.

(56) References Cited

U.S. PATENT DOCUMENTS

| | | | |
|---|---|---|---|
| 2009/0296422 A1* | 12/2009 | Lee .................. | G02F 1/133606 362/558 |
| 2015/0077644 A1* | 3/2015 | Menon ................ | G02B 6/0008 349/5 |
| 2016/0018582 A1 | 2/2016 | Fiorentino et al. | |
| 2016/0033705 A1 | 2/2016 | Fattal | |
| 2017/0131552 A1* | 5/2017 | Yokoyama .......... | G02B 5/1866 |
| 2018/0067251 A1* | 3/2018 | Baldwin .............. | G02B 6/0068 |
| 2018/0348421 A1 | 12/2018 | Kim et al. | |
| 2019/0094447 A1 | 3/2019 | Tan et al. | |
| 2019/0101681 A1* | 4/2019 | Meng .................... | G02B 6/005 |

FOREIGN PATENT DOCUMENTS

| | | |
|---|---|---|
| CN | 103901563 A | 7/2014 |
| CN | 105044975 A | 11/2015 |
| CN | 105074322 A | 11/2015 |
| CN | 106125316 A | 11/2016 |
| CN | 106200107 A | 12/2016 |
| CN | 106662700 A | 5/2017 |
| CN | 206193278 U | 5/2017 |
| CN | 107238974 A | 10/2017 |
| CN | 107621729 A | 1/2018 |
| KR | 100781383 B1 | 11/2007 |
| KR | 1020090105655 A | 10/2009 |
| KR | 1020090105665 A | 10/2009 |
| WO | 2016171705 A1 | 10/2016 |

OTHER PUBLICATIONS

Second Chinese Office Action in Chinese Application No. 201710608440.9 dated Mar. 31, 2020.
First Chinese Office Action in Chinese Application No. 201710608440.9 dated Jul. 24, 2019.
International Search Report and Written Opinon dated May 8, 2018.

* cited by examiner

BACKLIGHT MODULE AND LIQUID CRYSTAL DISPLAY DEVICE

CROSS REFERENCE OF RELATED APPLICATIONS

The present application claims priority of Chinese Patent Application No. 201710608440.9 filed on Jul. 24, 2017, the disclosure of which is incorporated herein by reference in its entirety as part of the present application.

TECHNICAL FIELD

Embodiments of the present disclosure relate to a backlight module and a liquid crystal display device.

BACKGROUND

A transparent display device refers to a display device that may form a transparent display state to make a viewer see rear scene thereof, and more commonly, the transparent display device may be applied in various fields such as department store display windows, perspective refrigerator doors, front windshields of automobiles, vending machines and the like, with effects of displaying, interaction, advertisement and so on, and the transparent display device has attracted more and more attention in special display fields due to its unique application scene and intelligent scene switching.

At present, a common transparent display device is a transparent liquid crystal display device, and the transparent liquid crystal display device comprises a light guide plate, a lower polarizer, a transparent liquid crystal display panel and an upper polarizer which are stacked sequentially. In order to increase evenness of emergent light, a film layer (for example, a prism film, a scattering film, a reflecting sheet, etc.) is further disposed on the light guide plate in the liquid crystal display device of the existing transparent liquid crystal display module, which, however, reduces light transmittance of the transparent liquid crystal display, and results in poor effect of transparent display of the liquid crystal display device of the transparent liquid crystal display module.

SUMMARY

At least one objective of the present disclosure is to provide a backlight module and a liquid crystal display device, in order to increase the light transmittance of the liquid crystal display device.

The first aspect of the present disclosure is to provide a backlight module, comprising: a light guide plate, comprising a light incident surface, a light emergent surface, and a bottom surface opposite to the light emergent surface; a light source, disposed on a side of the light incident surface of the light guide plate, wherein light emitted by the light source entering the light guide plate from the light incident surface; a plurality of collimating parts, disposed on at least one of the light emergent surface of the light guide plate and the bottom surface opposite to the light emergent surface, wherein a portion of the light entering the light guide plate is collimated by the plurality of collimating parts and emitted from the light emergent surface of the light guide plate.

The second aspect of the present disclosure is to provide a liquid crystal display device comprising the above-mentioned backlight module.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
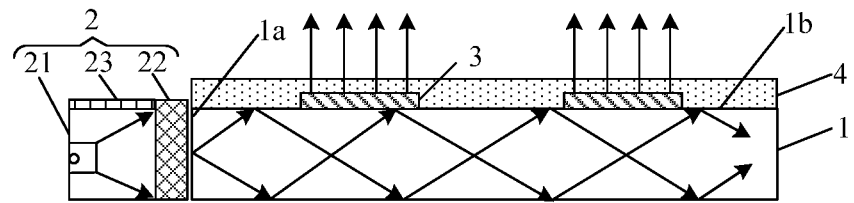
FIG. 1 is a structural schematic diagram of a backlight module provided by an embodiment of the present disclosure.
Figure 2:
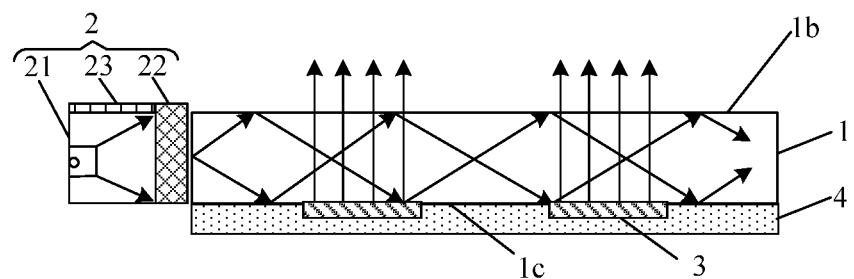
FIG. 2 is a structural schematic diagram of another backlight module provided by an embodiment of the present disclosure.
Figure 6:
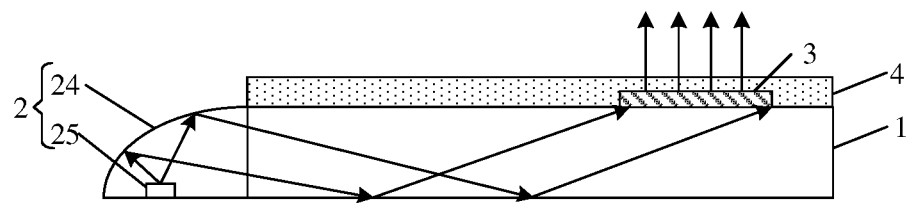
FIG. 6 is a structural schematic diagram of still another backlight module provided by an embodiment of the present disclosure.

Embodiments of the present disclosure provide a backlight module, and as illustrated in FIG. 1, FIG. 2 and FIG. 6, the backlight module comprises: a light guide plate 1, the light guide plate 1 comprising a light incident surface 1a, a light emergent surface 1b, and a bottom surface 1c opposite to the light emergent surface 1b; a light source 2, disposed on a side of the light incident surface 1a of the light guide plate 1, light emitted by the light source 2 incidents on the light incident surface 1b and enters the light guide plate 1; and a plurality of collimating parts 3, disposed on at least one of the light emergent surface 1b of the light guide plate 1 and the bottom surface 1c opposite to the light emergent surface 1b. Herein, a portion of the light entering the light guide plate 1 is collimated by the plurality of collimating parts 3 and emitted from the light emergent surface 1b of the light guide plate.

Exemplarily, as illustrated in FIG. 1, FIG. 2 and FIG. 6, in the backlight module provided by the embodiment of the present disclosure, the plurality of collimating parts 3 are uniformly disposed on the light emergent surface of the light guide plate 1 or the bottom surface 1c opposite to the light emergent surface, and the plurality of collimating parts 3 are disposed on the light emergent surface of the light guide plate 1 or the bottom surface 1c opposite to the light emergent surface in a same layer, so that fabrication of the collimating part 3 may be simplified.

Exemplarily, a plurality of collimating parts 3 are disposed on the light emergent surface 1b of the light guide plate 1, or a plurality of collimating parts 3 are disposed on the bottom surface 1c of the light guide plate 1, or a plurality of collimating parts 3 are disposed on a top surface 1b and the bottom surface 1c of the light guide plate 1. The plurality of collimating parts 3 are disposed on an outer surface of the light guide plate 1.

Figure 3:
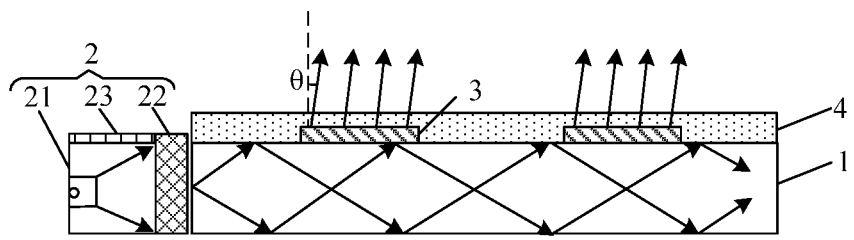
FIG. 3 is a structural schematic diagram of the collimated light from a collimating part of a backlight module provided by an embodiment of the present disclosure.

Exemplarily, as illustrated in FIG. 1, a light source 2 is disposed on the light incident surface 1a of the light guide plate 1, and a plurality of collimating parts 3 are disposed on the light emergent surface 1b of the light guide plate 1; for example, a specific structure of the collimating part 3 may be designed according to an incident angle of incident light emitted by the light source 2. The light emitted by the light source 2 enters the light guide plate 1, after being diffracted or reflected by the collimating part 3, the light is emitted from the light guide plate 1 in a collimating way. It should be noted that, as illustrated in FIG. 3, in condition that an included angle θ between the light emitted from the colli- mating part 3 and a normal line of the light guide plate is less than or equal to 0.15 degrees, the light may be considered as collimated light.

Exemplarily, as illustrated in FIG. 2, in the backlight module provided by the embodiment of the present disclosure, a plurality of collimating parts 3 are disposed on the bottom surface 1c of the light guide plate 1, and similarly, a specific structure of the collimating part 3 may also be designed according to an incident angle of the incident light emitted by the light source 2. The light emitted from the light source 2 enters the light guide plate 1, after being diffracted or reflected by the collimating part 3, the light is emitted from the light guide plate 1 in a collimating way.

In the backlight module provided by the embodiment of the present disclosure, the light emitted by the light source enters the light guiding plate 1. Because a plurality of collimating parts 3 are disposed on the light emergent surface 1b and/or the bottom surface 1c of the light guiding plate 1, the light is emitted from the light guide plate 1 in a collimating way after passing the collimating part 3. Because the collimating part has a characteristic of colli- mating light, the light emitted from the light guide plate 1 becomes collimated light, and the light emitted from the light guide plate has better evenness. Therefore, in the backlight module provided by the embodiments of the present disclosure, it is not necessary to provide a film layer such as a prism film, a scattering film, and a reflecting sheet and the like for increasing evenness of light emitted from the light guide plate on the light guide plate 1, so that light loss is reduced, overall light transmittance of the liquid crystal display device is increased, display effect of the liquid crystal display device is further increased, and in particular, effect of transparent display of the transparent liquid crystal display device is increased, too.

Exemplarily, the collimating part 3 may be an aperture grating or a multi-step grating, so that the light entering the light guiding plate 1 can be output from the aperture grating or the multi-step grating in a collimating way after being diffracted or reflected by the aperture grating or the multi- step grating.

Exemplarily, the plurality of collimating parts 3 include a plurality of aperture gratings or a plurality of multi-step gratings, each collimating part is uniformly arranged in a periodic manner. For example, the plurality of collimating parts are arranged at equal intervals in a row direction and a column direction on the light emergent surface 1b and/or the bottom surface 1c of the light guide plate.

Hereinafter, specific structures of the aperture grating or multi-step grating are described in detail by taking an example that the collimating part 3 is disposed on the light emergent surface 1b of the light guide plate 1 in the embodiment of the present disclosure.

Figure 4:
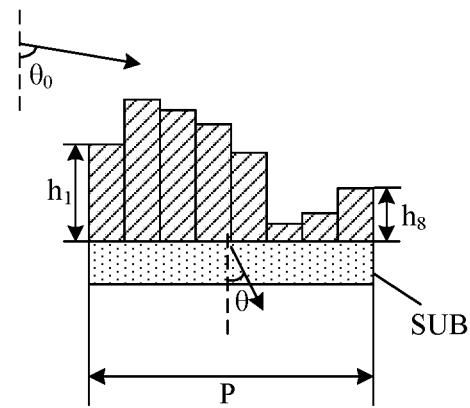
FIG. 4 is a structural schematic diagram of a multi-step grating provided by an embodiment of the present disclosure.

Exemplarily, as illustrated in FIG. 4, a height h of each step in the multi-step grating with respect to the light emergent surface 1b or the bottom surface 1c of the light guide plate 1 is greater than zero and less than or equal to 10 μm. For example, a grating period P of the multi-step grating is from 0.5 μm to 5 μm. For example, grating width of the multi-step grating is from 0.5 μm to 5 μm, and the grating width of the multi-step grating is a sum of widths of respective steps in the multi-step grating, and a ratio of the grating width of the multi-step grating to the grating period of the multi-step grating is greater than 0.5, and a direction of the grating width of the multi-step grating is perpendicu- lar to a direction of the height of the multi-step grating. In this way, the light becomes collimated light after being diffracted or reflected by the multi-step grating.

Exemplarily, as illustrated in FIG. 4, assuming that an incident angle $\theta_0$ of incident light is 85 degrees, a refractive index of a substrate SUB is 1.5, and a refractive index of air (i.e., an incident medium) is 1, a multi-step grating having 8 steps may be designed, and a grating period P and a grating width of the 8-step grating are both set to 1.8 μm, a height of an i-th grating step is hi, and a specific value of height of each grating step is shown in Table 1.

TABLE 1

Height of Respective Grating Steps

| i | $h_i$ (μm) | i | $h_i$ (μm) |
|---|---|---|---|
| 1 | 1.21 | 5 | 1.18 |
| 2 | 1.94 | 6 | 0.19 |
| 3 | 1.71 | 7 | 0.32 |
| 4 | 1.45 | 8 | 0.99 |

Experiments show that, the multi-step grating may achieve the light transmittance of 58%, a reflectivity of 42%, and an emergent angle θ of light of 0.14 degrees, so that it may be seen that the emergent angle is less than 0.15 degrees, requirements of collimated light is met, and light outgoing ratio of the grating may be up to 90%, and therefore, in a case that other structures of the liquid crystal display device are unchanged, as compared with the liquid crystal display device using an existing backlight module structure provided with a film layer on a light guide plate, overall light transmittance of the liquid crystal display device using the backlight module is greatly increased.

Figure 5:
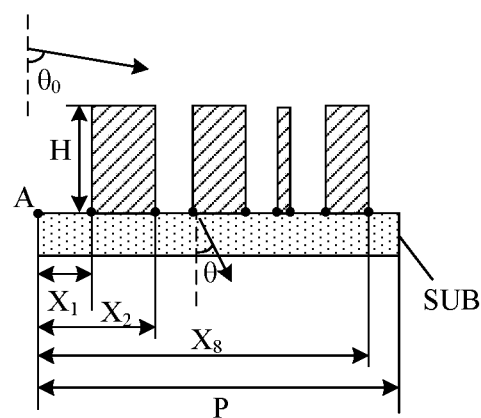
FIG. 5 is a structural schematic diagram of an aperture grating provided by an embodiment of the present disclosure.

Exemplarily, as illustrated in FIG. 5, a plurality of apertures are provided in one grating period P of the aperture grating, and the plurality of grating apertures are arranged at unequal intervals. For example, a pitch of every two adjacent grating apertures in the plurality of grating apertures is different from that between any other two adjacent grating apertures.

Exemplarily, as illustrated in FIG. 5, a plurality of grating steps are further disposed in one grating period of the aperture grating, the every two adjacent grating apertures is separated by a grating step, the respective grating steps have a same height, and the grating step has a height greater than zero and less than or equal to 10 μm.

The aperture grating can diffract or reflect the light and make the light become collimated light. It should be noted that, a cross section of the grating aperture in the aperture grating may be a shape such as rectangle or circle and so on, which is not limited in the embodiment of the present disclosure.

Exemplarily, as illustrated in FIG. 5, assuming that an incident angle $\theta_0$ of incident light is from 70 to 90 degrees, a refractive index of a substrate SUB is 1.5, and a refractive index of air (i.e., an incident medium) is 1, an aperture grating may be designed as having five apertures, and a grating period P is 0.95 μm, and a height of each grating step is H (H is in a range greater than zero and less than or equal to 10 μm). The grating period P starts at the point A in FIG. 5, specific structure of each grating aperture may be determined by a width of the grating step and a distance X between each grating step and the point A, for example, the distance Xj between a node j on each grating step and the point A in FIG. 5 may be used for determining the specific structure of each grating aperture. Specific distances between respective nodes j and the point A are shown in Table 2.

TABLE 2

Distances between Respective Nodes and Point A

| j | $X_j$ (μm) | j | $X_j$ (μm) |
|---|---|---|---|
| 1 | 0.21 | 5 | 0.68 |
| 2 | 0.25 | 6 | 0.7 |
| 3 | 0.27 | 7 | 0.77 |
| 4 | 0.39 | 8 | 0.9 |

Experiments show that, the aperture grating may achieve the light transmittance of 37%, a reflectivity of 63%, and an emergent angle θ of light of 0.15 degrees, which just meet the degree of the emergent angle required by the collimated light (0.15 degrees), and light outgoing ratio of the grating may be up to 73%, and therefore, in a case that other structures of the liquid crystal display device are unchanged, as compared with the liquid crystal display device using an existing backlight module structure provided with a film layer on a light guide plate, overall light transmittance of the liquid crystal display device using the backlight module is greatly increased.

Exemplarily, as illustrated in FIGS. 1 and 2, a transparent planarization layer 4 is disposed on the collimating part 3, and the planarization layer 4 is configured for flattening a surface where the collimating part is located, thereby making entire backlight module relatively flat. For example, a thickness of the planarization layer 4 is greater than or equal to 1 μm, so that a refractive index of the planarization layer 4 may be sufficiently large. Because a critical angle $\theta_0$ of total reflection of light in the light guide plate 1 meets the following equation, $$\theta_0 = \arcsin\left(\frac{n_1}{n_2}\right),$$

where $n_1$ is a refractive index of the planarization layer 4, $n_2$ is a refractive index of the light guide plate 1, so that the larger the refractive index of the planarization layer 4 is, the larger the total reflection angle of the light guide plate 1 in the backlight module is; in this way, the light entering the light guide plate 1 can be prevented from leaking. For example, in order to make the planarization layer 4 overlying all of the collimating parts 3, the thickness of the planarization layer 4 is greater than the heights of all of the collimating parts 3.

Exemplarily, an emergent angle of light emitted by light source 2 is greater than the critical angle $\theta_0$ of total reflection of the light in the light guide plate 1, $$\theta_0 = \arcsin\left(\frac{n_1}{n_2}\right),$$

where, $n_1$ is a refractive index of the planarization layer 4, and $n_2$ is a refractive index of the light guide plate 1. In a case that the emergent angle of the light emitted by the light source 2 is greater than the critical angle of the total reflection of the light in the light guide plate 1, the emergent light entering the light guide plate 1 is totally reflected and propagates in a way of total reflection. For example, the light entering the light guide plate 1 may continue to propagate in a way of total reflection in a region without disposing the collimating part 3. When the light entering the light guide plate 1 is incident on a region having the collimating part 3 disposed thereon, the light is diffracted or reflected by the collimating part 3, and then emitted from the collimating part 3 in a collimating way.

Exemplarily, as illustrated in FIGS. 1 and 2, the light source 2 comprises a light bar 21 and a coupling grating 22, the coupling grating 22 is disposed between the light incident surface 1a of the light guide plate 1 and the light bar 21. The coupling grating 22 is configured to converge light having large angle emitted by the light bar 21 as light having a small divergence angle greater than the critical angle $\theta_0$ of the total reflection of the light in the light guide plate 1; in this way, the coupled light is incident onto the light guide plate 1, and the total reflection propagation of the light can be achieved in the light guide plate 1. For example, a structure of the coupling grating 22 is designed for an incident angle of light emitted by the light bar 21. For example, the incident angle of the light emitted by the light bar 21 is from −60° to 60°, a step length of a coupling grating is designed to be 10°, that is, twelve regions of different grating parameters serves to transform incident light of different angles emitted by the light bar 21 and make them entering the light guide plate 1 at a same angle.

It should be noted that, as illustrated in FIG. 1 and FIG. 2, upper or lower portions of the light bar 21 may further be provided with a reflecting sheet 23, so that light leaking from the upper or lower portions of the light bar 21 can be reflected to the light bar 21 and then enters the light guide plate 1, thereby increasing light utilization.

Exemplarily, a refractive index of an outer cover of the light bar 21 is less than a refractive index of the light guide plate 1, so that light emitted by light source in the light bar 21 is refracted by the outer cover of the light bar 21, and then an emergent angle of the emergent light becomes large, which further ensures that the emergent angle of the emergent light is greater than the critical angle $\theta_0$ of total reflection of the light in the light guide plate 1, so that total reflection propagation in the light guide plate 1 can be achieved.

Exemplarily, as illustrated in FIG. 6, the light source 2 further comprises a parabolic reflector 24 disposed on the light incident surface 1a of the light guide plate 1, and a luminous body 25 disposed in a position of a focal point of the parabolic reflector 24. Because the luminous body 25 is disposed in the position of the focal point of the parabolic reflector 24, light emitted from the luminous body 25 has same brightness, and become parallel light after being reflected by the parabolic reflector 24, so that the light incident onto the light guide plate 1 are all parallel light, thereby increasing evenness of light incident into the light guide plate 1.

Figure 7:
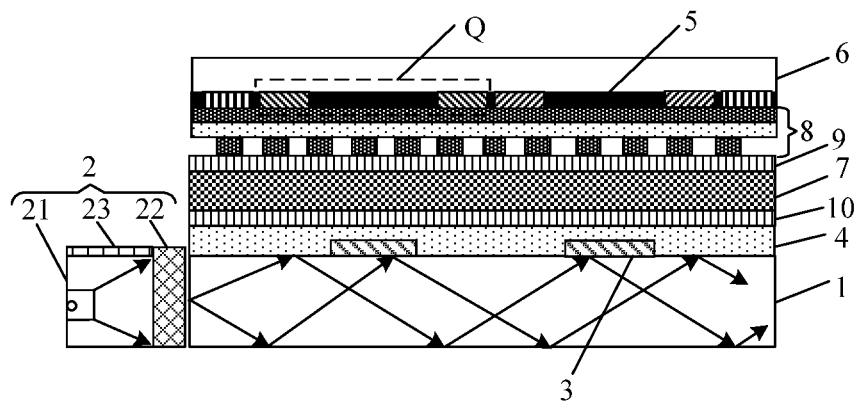
FIG. 7 is a structural schematic diagram of a liquid crystal display device provided by an embodiment of the present disclosure.
Figure 8:
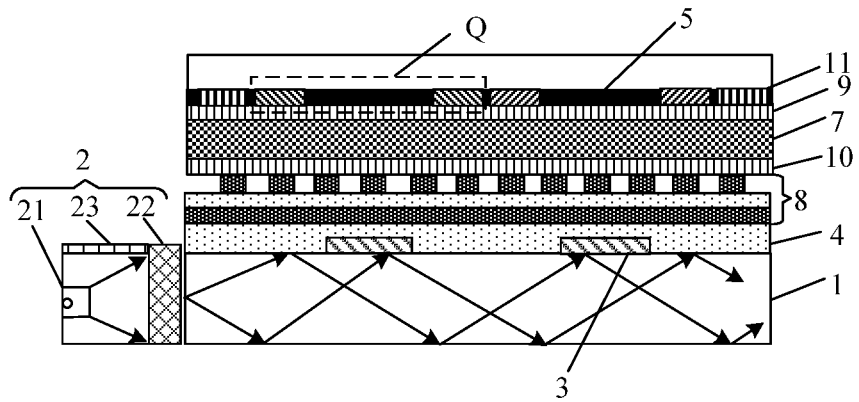
FIG. 8 is a structural schematic diagram of another liquid crystal display device provided by an embodiment of the present disclosure.
Figure 9:
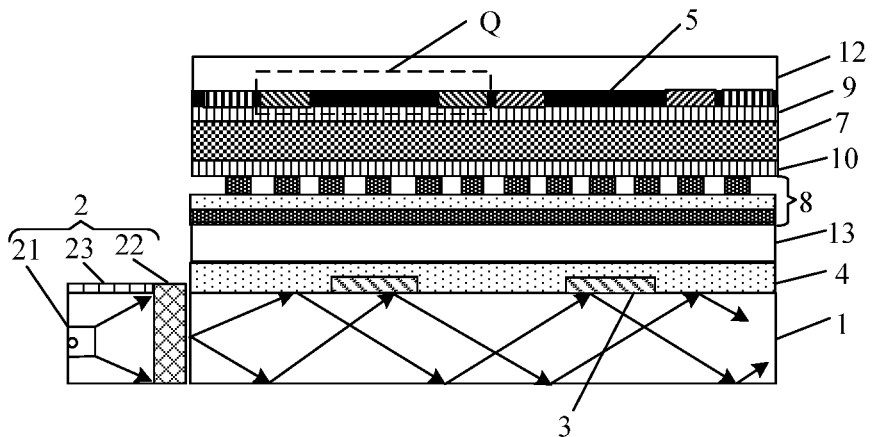
FIG. 9 is a structural schematic diagram of still another liquid crystal display device provided by an embodiment of the present disclosure.

An embodiment of the present disclosure further provides a liquid crystal display device, and as illustrated in FIG. 7 to FIG. 9, the liquid crystal display device comprises the backlight module described above.

As compared with the prior art, beneficial effects of the liquid crystal display device provided by the embodiment of the present disclosure are same as those of the backlight module described above, which will not be described herein again. In addition, in the liquid crystal display device provided by the embodiment of the disclosure, the light emitted from the backlight module is a collimated light, which then enters the liquid crystal display panel. The liquid crystal layer in the liquid crystal display device is applied with different voltages, so as to deflect the liquid crystal layer and form different liquid crystal gratings. The collimated light entering the liquid crystal display panel is output from the respective sub-pixels of the liquid crystal display device after being diffracted or refracted by the liquid crystal gratings, and thus a gray scale display of the liquid crystal display device is realized. Thus, the liquid crystal display device can display image without providing two polarizers. As a result, the light transmittance of the liquid crystal display device is further increased, and transparent display of the liquid crystal display device is further facilitated.

Exemplarily, as illustrated in FIG. 7 to FIG. 9, the liquid crystal display device comprises a plurality of pixel units, each of the pixel units comprises a plurality of sub-pixels Q, and each of the sub-pixels Q comprises a light shielding portion 5 and color filters located on both sides of the light shielding portion 5. Optionally, the color filters located on both sides of the light shielding portion 5 have same color. For example, the color filters are a color resist layer of same color or the same light emitting material. For example, the light emitting material is an organic electroluminescent material or a quantum dot luminescent material. The respective collimating parts 3 of the backlight module are in one-to-one correspondence with the light shielding portions 5, so that the light shielding portions 5 of the sub-pixels Q can shield light emitted from the collimating parts 3 corresponding to the light shielding portions 5 in condition that no voltage is applied to the liquid crystals, in this way, a dark state display of the liquid crystal display device is realized.

Exemplarily, orthographic projections of the collimating parts 3 on the light guide plate of the backlight module are all located in orthographic projections of the light shielding portions 5 corresponding to the collimating parts 3 on the light guide plate of the backlight module. For example, an area of the orthographic projection of the collimating part 3 on the light guide plate of the backlight module is smaller than or equal to an area of the orthographic projection of the light shielding portion 5 corresponding to the collimating part 3 on the light guide plate of the backlight module.

It should be noted that, the liquid crystal display device further comprises a liquid crystal display panel. The specific structure of the liquid crystal display panel is various and may be configured by a person skilled in the art according to actual needs. In order to make those skilled in the art understand and implement conveniently, three types of liquid crystal display panels are described in the following embodiments of the present disclosure:

A first type of liquid crystal display panel: as illustrated in FIG. 7, the liquid crystal display panel comprises: an AOC (Array on Color-filter) substrate 6 and a liquid crystal layer 7 located between the AOC substrate 6 and the backlight module. An electrode layer 8 is disposed between the AOC substrate 6 and the liquid crystal layer 7 of the backlight module, a first alignment layer 9 is disposed between the electrode layer 8 and the liquid crystal layer 7, and a second alignment layer 10 is disposed between the liquid crystal layer 7 and the planarization layer 4 of the backlight module.

By adopting the AOC substrate 6 in the liquid crystal display panel, that is, the electrode layer 8 and a TFT array are both formed on a color filter substrate, it is not necessary to dispose an array substrate in the liquid crystal display panel, and it is only to dispose the liquid crystal layer 7 between the AOC substrate 6 and the backlight module, and then the AOC substrate 6 and the backlight module are cell-assembled to form a liquid crystal display device, thereby simplifying internal structure of the liquid crystal display device, reducing a number of film layers which the light emitted by the backlight module passes through, reducing light loss, and increasing the light transmittance of the liquid crystal display device. Moreover, because the liquid crystal display device doesn't have the array substrate, a distance between the collimating part 3 in the backlight module and the color filter layer is reduced as compared with an existing liquid crystal display device. Generally, during internal propagation of light in the liquid crystal display device, because the plurality of film layers in the liquid crystal display device may refract light, the light propagating in the liquid crystal display device is divergent. In the embodiment, because a number of film layers where light emitted by the backlight module passes is reduced, in one aspect, the distance between the collimating part 3 in the backlight module and the color filter layer is reduced, and in another aspect, the light transmitted to the color filter layer is more concentrated, so that light utilization efficiency of the liquid crystal display device is further increased.

A second type of liquid crystal display panel: as illustrated in FIG. 8, the liquid crystal display panel comprises a color filter layer 11, an electrode layer 8, a TFT array layer (not shown), and a liquid crystal layer 7 between the electrode layer 8 and the color filter layer 11. The electrode layer 8 and the TFT array layer are sequentially stacked on a surface of the light guide plate 1 facing the color filter layer 11, and a first alignment layer 9 is disposed between the color filter layer 11 and the liquid crystal layer 7; and a second alignment layer 10 is disposed between the electrode layer 8 and the liquid crystal layer 7.

By fabricating both the electrode layer 8 and the TFT array layer in the liquid crystal display panel on a surface of the light guide plate 1 facing the color filter layer 11, it is not necessary to dispose an array substrate in the liquid crystal display panel, and it is only to dispose the liquid crystal layer 7 between the color filter layer 11 and the backlight module where the electrode layer 8 and the TFT array layer have been formed, and then the color filter substrate provided with the color filter layer 11 and the backlight module are cell-assembled to form a liquid crystal display device, thereby simplifying internal structure of the liquid crystal display device, reducing a number of film layers where light emitted by the backlight module passes, further reducing light loss, and increasing the light transmittance of the liquid crystal display device. Moreover, since the array substrate is not disposed in the liquid crystal display device, a distance between the collimating part 3 and the color filter layer in the backlight module is reduced as compared with an existing liquid crystal display device. Generally, in internal propagation of light in the liquid crystal display device, since there are a plurality of film layers in the liquid crystal display device, which may refract light, and thus the light is spread in a divergence way in the liquid crystal display device. In the embodiment, since a number of film layers where the light passes is reduced, in one aspect, the distance between the collimating part 3 in the backlight module and the color filter layer is reduced, and in another aspect, the light propagating to the color filter layer is more concentrated, so that light utilization efficiency of the liquid crystal display device is further increased.

A third type of the liquid crystal display panel: as illustrated in FIG. 9, the liquid crystal display panel comprises a color filter substrate 12, an array substrate 13, and a liquid crystal layer 7 located between the color filter substrate 12 and the array substrate 13. A first alignment layer 9 is disposed between the color filter substrate 12 and the liquid crystal layer 7, an electrode layer 8 is disposed on one surface of the array substrate 13 facing the liquid crystal layer 7, and a second alignment layer 10 is disposed between the electrode layer 8 and the liquid crystal layer 7.

Exemplarily, the color filter layer is a quantum dot color filter layer. In one aspect, when light emitted by the backlight module is monochromatic light having short wavelength, the quantum dots can be excited to realize color display of the liquid crystal display device; in another aspect, the quantum dots have good scattering characteristics, and therefore, the quantum dot color film is selected to scatter the emergent light, thereby increasing a viewing angle of the liquid crystal display device. Optionally, the quantum dot color filter layer is an R/G/B quantum dot color filter layer.

Figure 10:
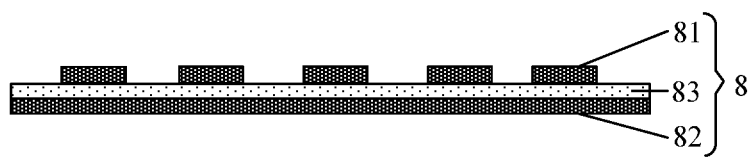
FIG. 10 is a structural schematic diagram of an electrode layer in a liquid crystal display device provided by an embodiment of the present disclosure.

Exemplarily, as illustrated in FIG. 10, the electrode layer 8 of the embodiment of the present disclosure comprises a pixel electrode 81 and a common electrode 82, and the pixel electrode 81 and the common electrode 82 are separated by an insulating layer 83.

Figure 11:
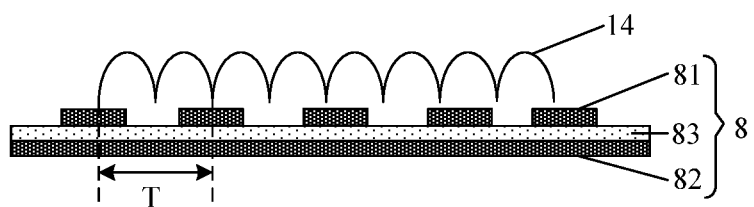
FIG. 11 is a structural schematic diagram of a liquid crystal grating in a liquid crystal display device provided by an embodiment of the present disclosure.

Exemplarily, as illustrated in FIG. 11, after a voltage is applied to the liquid crystal layer in the liquid crystal display device provided by the embodiment of the present disclosure, at least two liquid crystal gratings 14 are formed in a single electrode period T, so that the highest point of the liquid crystal grating 14 is relatively lower, diffraction efficiency of the liquid crystal grating 14 is obvious. It can be contemplated that a liquid crystal grating 14 may be formed by a plurality of electrodes, which is not limited in the embodiment of the disclosure. In addition, in the electrode layer 8, the pixel electrode 81 and the common electrode 82 may also be both flat plate electrodes or both strip electrodes, and moreover, the pixel electrode 81 and the common electrode 82 may be respectively disposed on upper and lower sides of the liquid crystal layer 7, which is not limited in the embodiment of the disclosure.

Figure 12:
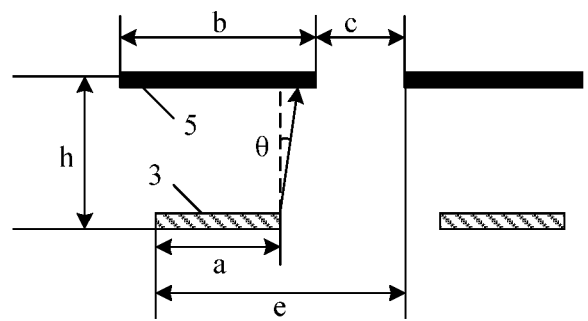
FIG. 12 is a schematic diagram of positional relationship between a light shielding portion and a collimating part in a liquid crystal display device provided by an embodiment of the present disclosure.

Exemplarily, as illustrated in FIG. 12, the light shielding portion 5 corresponding to the sub-pixel in the liquid crystal display device is disposed in a same layer with the color filter layer, and a width of the light shielding portion 5 is b, b=a+(h×tan θ+d)×2, where a is a width of the collimating part 3 corresponding to the light shielding portion 5, h is a distance between a surface of the light guide plate having the collimating part 3 disposed thereon and a lower surface of the light shielding portion 5, θ is an angle of light emitted from the collimating part 3, and d is a process deviation in fabricating the light shielding portion 5. A width direction of the collimating part 3 is same as a width direction of the light shielding portion 5, the width direction of the collimating part 3 is perpendicular to a direction of a distance between the surface of the light guide plate 1 where the collimating part 3 is located and the lower surface of the light shielding portion 5.

When the width b of the light shielding portion satisfies the following equation b=a+(h×tan θ+d)×2, the light shielding portion 5 can completely shield light emitted from the corresponding collimating part 3 to the liquid crystal display panel, and thus an aperture ratio of a display region of the liquid crystal display device is the biggest while avoiding a light leakage phenomenon. For example, as illustrated in FIG. 12, when the width of the sub-pixel e is constant, after the width of the light shielding portion is determined, a width c of a transmitting region is obtained, i.e., c=e−b, and further the aperture ratio r of the display region is obtained, i.e., $$r = \frac{c}{b+c}.$$

Figure 13:
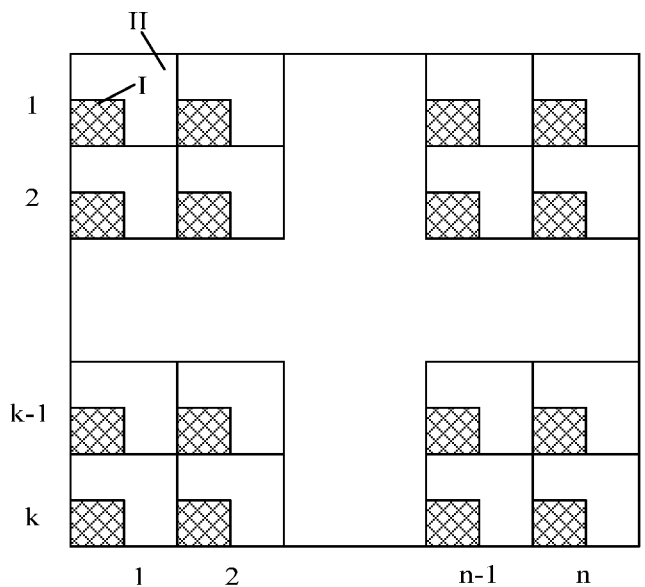
FIG. 13 is a schematic diagram of resolution setting of a liquid crystal display device provided by an embodiment of the present disclosure.

Exemplarily, the liquid crystal display device is a transparent liquid crystal display device. As illustrated in FIG. 13, the pixel unit comprises a display region I and a transmitting region II for increasing light passing the pixel unit, and a plurality of sub-pixels are all located in the display region I of the pixel unit, so that the light transmittance of background light can be effectively increased, and transparency of the liquid crystal display device can be increased. In addition, the liquid crystal display device comprises data lines and gate lines intersecting each other horizontally and vertically in the display region of the pixel unit. The plurality of sub-pixels in the pixel unit are arranged along an extending direction of the data lines in the display region I, and each sub-pixel is connected with a gate line corresponding thereto, and the plurality of sub-pixels are connected with a same data line. The extending direction of the data line is perpendicular to the width direction of the display region I of the pixel unit. In a premise that the width of the display region I of the pixel unit is constant and the plurality of sub-pixels in the pixel unit are arranged in the display region I along the extending direction of the data line, a pixel density of the display region I of the pixel unit is increased by n times, where n is the number of the sub-pixels in each pixel unit, as compared with that the plurality of sub-pixels in the pixel unit are arranged in the width direction of the display region I.

Exemplarily, in order to make those skilled in the art understand and implement conveniently, there is provided an example of a transparent liquid crystal display device in the embodiment of the present disclosure:

As illustrated in FIG. 13, a resolution of the liquid crystal display device is n*k. In one pixel unit, an area ratio of the display region I is x, an area ratio of the transmitting region II is 1-x, and liquid crystal lighting efficacy of the pixel unit is A, the light transmittance of the entire film layer in the pixel unit is B, and an aperture ratio of the display region I is r, thus, the light transmittance R of the liquid crystal display device can be obtained by the equation: $R=B \times x \times A \times r + B \times (1-x) \times 100\%$. However, when the transmitting region II is not disposed in the pixel unit of the liquid crystal display device, the transmittance of the liquid crystal display device is $R_1$, $R_1 = B \times A \times r$. As compared with the transmittance R of the liquid crystal display device where the transmitting region II is disposed, a difference in transmittance is that, $\Delta R = B \times [(x-1) \times (A \times r - 1)]$, because $A \times r$ is less than 1 due to x is less than 1, the transmittance of the liquid crystal display device can be effectively increased by disposing the transmitting region II in the pixel unit of the liquid crystal display device.

Figure 14:
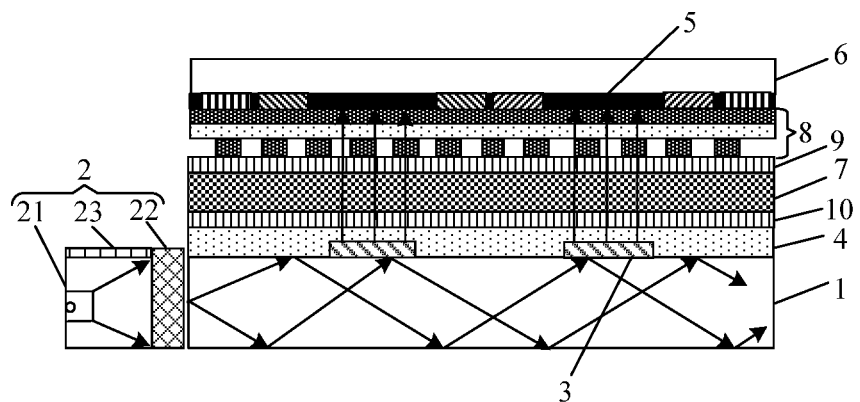
FIG. 14 is a structural schematic diagram of realizing a dark state display by a liquid crystal display device provided by an embodiment of the present disclosure.
Figure 15:
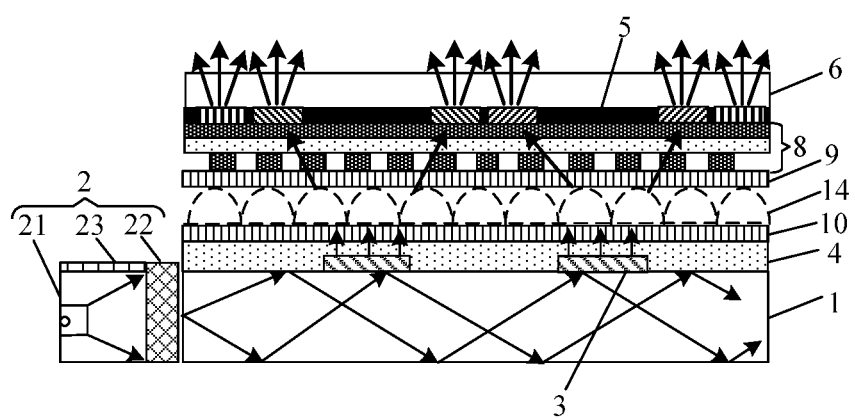
FIG. 15 is a structural schematic diagram of realizing a gray scale display by a liquid crystal display device provided by an embodiment of the present disclosure.

In addition, an embodiment of the present disclosure further provides a display method. The display method is applied to the liquid crystal display device described above. Exemplarily, as illustrated in FIG. 14 and FIG. 15, display modes of the liquid crystal display device comprise a dark state display and a gray scale display, and the display method comprises:

allowing light emitted by the light source 2 of the backlight module to enter the light guide plate 1 of the backlight module and to be emitted from the respective collimating parts 3 of the backlight module after being collimated;

shielding the light emitted from the collimating parts 3 by using the light shielding portions 5, to realize the dark state display of the liquid crystal display device, the light shielding portions 5 corresponding to the respective sub-pixels in the liquid crystal display device;

applying different voltages to the liquid crystal layer 7 in the liquid crystal display device, to deflect liquid crystal molecules in the liquid crystal layer 7, so as to form different liquid crystal gratings, wherein the light emitted from the collimating part 3 is output from color filter layers of the respective sub-pixels after being diffracted or refracted by the liquid crystal gratings, to realize the gray scale display of the liquid crystal display device.

In the liquid crystal display device and the display method thereof provided by the embodiments of the present disclosure, the light entering the liquid crystal display panel from the backlight module is collimated light, and therefore, different voltages are applied to the liquid crystal layer in the liquid crystal display device to deflect the liquid crystal molecules in the liquid crystal layer to form different liquid crystal gratings, the collimated light entering the liquid crystal display panel can emit from the respective sub-pixels of the liquid crystal display device after being diffracted or refracted by the liquid crystal gratings, to realize the gray scale display of the liquid crystal display device, so that the liquid crystal display device can display image without disposing two polarizers, the light transmittance of the liquid crystal display device is further increased, and it is more favorable for realizing transparent display of the liquid crystal display device.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

What is described above is related to the illustrative embodiments of the disclosure only and not limitative to the scope of the disclosure; the scopes of the disclosure are defined by the accompanying claims.

The invention claimed is:

1. A backlight module, comprising:
    a light guide plate, comprising a light incident surface, a light emergent surface, and a bottom surface opposite to the light emergent surface;
    a light source, disposed on a side of the light incident surface of the light guide plate, wherein light emitted by the light source entering the light guide plate from the light incident surface;
    a plurality of collimating parts, disposed on at least one of the light emergent surface of the light guide plate and the bottom surface opposite to the light emergent surface, wherein a portion of the light entering the light guide plate is collimated by the plurality of collimating parts and emitted from the light emergent surface of the light guide plate.

2. The backlight module according to claim 1, wherein the collimating part is an aperture grating or a step grating.

3. The backlight module according to claim 2, wherein a height of each step in a multi-step grating with respect to the light emergent surface or the bottom surface of the light guide plate is greater than zero and less than or equal to 10 μm.

4. The backlight module according to claim 2, wherein a grating period of the multi-step grating is from 0.5 μm to 5 μm, a grating width of the multi-step grating is a sum of widths of all steps in the multi-step grating, a ratio of the grating width to the grating period is greater than 0.5, and the grating width is from 0.5 µm to 5 µm.

5. The backlight module according to claim 2, wherein a plurality of grating apertures are provided in a single grating period of the aperture grating, the plurality of grating apertures are disposed at unequal intervals.

6. The backlight module according to claim 5, wherein a pitch between every two adjacent grating apertures in the plurality of grating apertures is different from that between any other two adjacent grating apertures.

7. The backlight module according to claim 5, wherein a plurality of grating steps are further disposed in the single grating period of the aperture grating, every two adjacent grating apertures are separated by a grating step, the respective grating steps have a same height greater than zero and less than or equal to 10 µm.

8. The backlight module according to claim 1, wherein a transparent planarization layer is disposed on the plurality of collimating parts, the planarization layer has a thickness greater than or equal to 1 µm.

9. The backlight module according to claim 8, wherein an emergent angle of light emitted by the light source is greater than a critical angle $\theta_0$ of total reflection of light in the light guide plate, $$\theta_0 = \arcsin\left(\frac{n_1}{n_2}\right),$$

where, $n_1$ is a refractive index of the planarization layer, and $n_2$ is a refractive index of the light guide plate.

10. The backlight module according to claim 1, wherein the light source comprises a light bar and a coupling grating, the coupling grating is disposed between the light incident surface of the light guide plate and the light bar.

11. The backlight module according to claim 1, wherein the light source comprises a parabolic reflector and a luminous body, the luminous body is disposed at focal point of the parabolic reflector.

12. A liquid crystal display device, comprising the backlight module according to claim 1.

13. The liquid crystal display device according to claim 12, wherein the liquid crystal display device comprises a plurality of pixel units, each pixel unit comprises a plurality of sub-pixels, respective collimating parts of the backlight module are in one-to-one correspondence with light shielding portions of the respective sub-pixels.

14. The liquid crystal display device according to claim 13, wherein a width of each light shielding portion is b, b=a+(h×tan θ+d)×2, where a is a width of the collimating part corresponding to the light shielding portion, h is a distance between a surface of the light guide plate where the collimating part is located and a lower surface of the light shielding portion, θ is an angle of light emitted from the collimating part, and d is a process deviation in fabricating the light shielding portion.

15. The liquid crystal display device according to claim 13, wherein the liquid crystal display device is a transparent liquid crystal display device, each pixel unit comprises a display region and a transmitting region configured for increasing light passing the pixel unit, and a plurality of sub-pixels in each pixel unit are located in the display region of the pixel unit.

16. The liquid crystal display device according to claim 15, wherein each pixel unit comprises a data line and a gate line disposed in the display region, the plurality of sub-pixels are arranged along an extending direction of the data line sequentially and are connected with the same data line, and each sub-pixel of the pixel unit is connected with a single gate line.

17. The liquid crystal display device according to claim 12, wherein the liquid crystal display device further comprises a liquid crystal display panel, the liquid crystal display panel comprises an AOC substrate, and a liquid crystal layer located between the AOC substrate and the backlight module, an electrode layer is disposed between a color filter layer of the AOC substrate and the liquid crystal layer, a first alignment layer is disposed between the electrode layer and the liquid crystal layer, and a second alignment layer is disposed between the liquid crystal layer and a planarization layer of the backlight module.

18. The liquid crystal display device according to claim 17, wherein the color filter layer is a quantum dot color filter layer.

19. The backlight module according to claim 3, wherein a grating period of the multi-step grating is from 0.5 µm to 5 µm, a grating width of the multi-step grating is a sum of widths of all steps in the multi-step grating, a ratio of the grating width to the grating period is greater than 0.5, and the grating width is from 0.5 µm to 5 µm.

20. The backlight module according to claim 2, wherein a transparent planarization layer is disposed on the plurality of collimating parts, the planarization layer has a thickness greater than or equal to 1 µm.

\* \* \* \* \*